(12) United States Patent
Page

(10) Patent No.: US 11,597,501 B2
(45) Date of Patent: Mar. 7, 2023

(54) DEPLOYABLE NOISE SHIELD PANELS

(71) Applicant: Blended Wing Aircraft, Inc., Orange, CA (US)

(72) Inventor: Mark A. Page, Orange, CA (US)

(73) Assignee: Blended Wing Aircraft, Inc., Orange, CA (US)

( * ) Notice: Subject to any disclaimer, the term of this patent is extended or adjusted under 35 U.S.C. 154(b) by 170 days.

(21) Appl. No.: 16/726,696

(22) Filed: Dec. 24, 2019

(65) Prior Publication Data

US 2020/0283122 A1  Sep. 10, 2020

Related U.S. Application Data

(60) Provisional application No. 62/786,604, filed on Dec. 31, 2018.

(51) Int. Cl.
*B64C 1/40* (2006.01)
*B64C 7/00* (2006.01)
*B64C 39/10* (2006.01)
*B64D 29/00* (2006.01)
*B64C 39/00* (2023.01)

(52) U.S. Cl.
CPC .............. *B64C 7/00* (2013.01); *B64C 1/40* (2013.01); *B64C 39/10* (2013.01); *B64D 29/00* (2013.01); *B64C 2039/105* (2013.01)

(58) Field of Classification Search
CPC .. B64C 7/00; B64C 1/40; B64C 39/10; B64C 2039/105; B64D 29/00; B64D 27/20; Y02T 50/10
See application file for complete search history.

(56) References Cited

U.S. PATENT DOCUMENTS

| | | | | |
|---|---|---|---|---|
| 3,576,300 A | * | 4/1971 | Palfreyman | B64D 27/20 244/36 |
| 4,036,452 A | * | 7/1977 | Schairer | B64D 33/06 244/1 N |
| 5,034,751 A | * | 7/1991 | Miller, Jr. | H01Q 1/28 342/368 |
| 5,437,419 A | * | 8/1995 | Schmitz | B64C 27/28 244/17.11 |
| D364,600 S | * | 11/1995 | Andrews | D12/319 |
| D608,720 S | * | 1/2010 | Saint-Jalmes | B64D 27/14 D12/319 |
| 8,011,613 B2 | * | 9/2011 | Belleville | B64D 27/14 244/1 N |

(Continued)

FOREIGN PATENT DOCUMENTS

DE  3815422 A1 * 11/1989 ............. B64C 39/10
DE  3815422 A1  11/1989

(Continued)

OTHER PUBLICATIONS

International Search Report and Written Opinion dated Mar. 13, 2020 for PCT Application No. PCT/US2019/068498, 10 pages.

*Primary Examiner* — Assres H Woldemaryam
(74) *Attorney, Agent, or Firm* — Caldwell Intellectual Property Law

(57) ABSTRACT

Technologies for providing noise shielding are described herein. In some examples, noise shields are installed proximate to one or more of the main engines of the aircraft. The noise shields can be extended during terminal operations and retracted during flight operations.

15 Claims, 6 Drawing Sheets

(56) References Cited

U.S. PATENT DOCUMENTS

| | | | | |
|---|---|---|---|---|
| 8,016,233 B2* | 9/2011 | Moore | ............ | B64C 39/12 |
| | | | | 244/119 |
| 8,313,055 B2* | 11/2012 | Gall | ............ | B64D 27/14 |
| | | | | 244/55 |
| 8,628,040 B2* | 1/2014 | Moore | ............ | B64C 5/08 |
| | | | | 244/119 |
| 2003/0168552 A1* | 9/2003 | Brown | ............ | B64D 27/08 |
| | | | | 244/55 |
| 2007/0023571 A1* | 2/2007 | Kawai | ............ | F02K 1/48 |
| | | | | 244/119 |
| 2009/0020643 A1* | 1/2009 | Gall | ............ | B64D 27/14 |
| | | | | 244/54 |
| 2009/0045287 A1 | 2/2009 | Belleville | | |
| 2009/0057493 A1 | 3/2009 | Sankrithi et al. | | |
| 2013/0320137 A1* | 12/2013 | Maenz | ............ | B64C 5/06 |
| | | | | 244/87 |

FOREIGN PATENT DOCUMENTS

| | | | | |
|---|---|---|---|---|
| FR | 2942202 A1 * | 8/2010 | ............ | B64D 33/06 |
| FR | 2942202 A1 | 8/2010 | | |

\* cited by examiner

DEPLOYABLE NOISE SHIELD PANELS

CROSS REFERENCE TO RELATED APPLICATIONS

This application claims the benefit of U.S. Provisional Application No. 62/786,604 field Dec. 31, 2018, which is incorporated herein by reference in its entirety.

BACKGROUND

Conventional aircraft consist essentially of a wing section and a fuselage. This so-called "tube and wing" configuration enables convenient packaging of passengers and cargo, but has certain drawbacks. In most cases, passengers are seated on a deck disposed approximately on the vertical centerline of the fuselage, while cargo is stowed beneath. This enables a relatively wide, flat floor for seats and separates cargo operations from passenger loading and unloading. Passengers can be loaded via one or more passenger doors, while cargo can be loaded from one or more cargo hatches on the underside or sides of the fuselage. This configuration also provides a relative constant fuselage cross section (less the nose and tail cones), enabling a substantially percentage of the available volume of the fuselage to be utilized.

As in other airplane types, noise reduction is an important consideration for a blended wing body ("BWB") aircraft. In a BWB aircraft configuration and other aircraft configurations, like tube and wing, the aircraft may operate in locations in which the noise generated by the engines may create an environmental issue. The airport from which the aircraft is to take off may be located appreciably near to residences or offices that the engine noise may be a nuisance. Further, the airport may be located in areas in which the noise may cause harm upon the animals and plants in the environment.

SUMMARY

In a BWB aircraft, deployable noise shield panels are described. These can be lowered for up and away flight. The panels are hinged and can be raised and lowered about an axis using hydraulic, pneumatic, or electrical means. The panels are designed to be deployed when in terminal operations (e.g. when the aircraft is at or near an aircraft terminal or on a runway). The panels are lowered either before takeoff, during takeoff, or after takeoff. By using the panels only during terminal area operations, the aerodynamic loads may much lower than fixed reflector fins that must endure flight loads at high Mach and dynamic pressure.

DETAILED DESCRIPTION

Examples of the present disclosure related generally to providing noise shielding in a BWB aircraft. In some examples of the presently disclosed subject matter, deployable and retractable noise shield panels are installed proximate to one or more main engines of the BWB aircraft. The noise shield panels are designed so that during terminal operations, e.g. operations while the aircraft is at the airport or taking off from the airport, the noise created by the engines are deflected. The deflection of the noise from the engines can reduce the environmental and nuisance impact in the surrounding areas.

Figure 1:
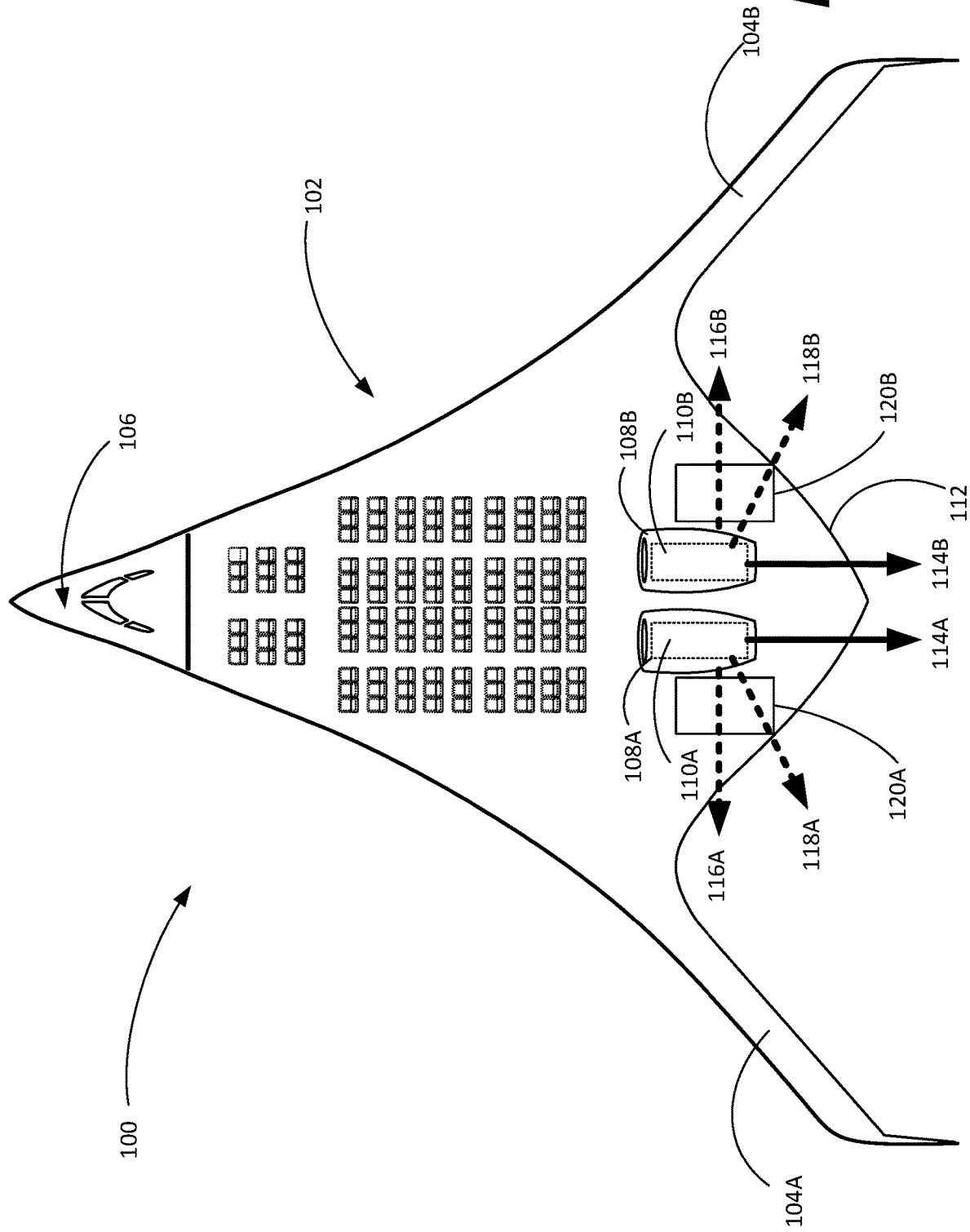
FIG. 1 is a top-down view illustration of a BWB with noise panels, according to some examples disclosed herein.

FIG. 1 is a top-down view illustration of a BWB aircraft 100 configured with noise shield panels, according to some examples disclosed herein. As illustrated in FIG. 1, the BWB aircraft 100 includes a fuselage 102. The fuselage 102 includes a port wing 104A and a starboard wing 104B that are continuously coupled to a nose section 106 of the BWB aircraft 100. The fuselage 102 and wings 104A and 104B are each illustrated to have positive sweep angles. The BWB aircraft 100 further includes nacelle 108A that houses port main engine 110A and nacelle 108B that houses starboard main engine 110B. The BWB aircraft of FIG. 1 is a single deck BWB aircraft configuration, though various examples of the presently disclosed subject matter can be used with different BWB aircraft having more than one deck.

As noted above, when operational, the main engines 110A and 110B of the BWB aircraft 100 generate noise. At takeoff, one of the main engines 110A and 110B can generate noise at levels approaching or exceeding 150 decibels (dB). These noise levels, and the frequencies at which they occur, can be problematic. Low frequency airplane noise during takeoff and landing periods can be a serious environment and human hazard. The low frequencies originating from the airplanes could potentially be an easy target for detection. Further, since there is often very little attenuation at the low frequencies, the low frequency sound can propagate to relatively long distances. Excessive noise has been linked to numerous health problems, including hearing impairment, hypertension, ischemic heart disease, annoyance, stress and sleep disturbance.

In some examples, some BWB aircraft provide an advantage over other types of aircraft, such as tube and wing, because the inlet and exhaust planes of the main engines 110A and 110B may be sufficiently displaced forward of a trailing edge 112, so that the noise emanating rearward (vector 114A and vector 114B) is reflected up and away from the ground behind the BWB aircraft 100.

However, the noise emanating sideways (vectors 116A and 116B) and in other directions (examples given as vectors 118A and 118B) may not be reflected in conventional BWB aircraft. Some conventional aircraft may attempt to reduce sideways noise transmissions using fixed structures such as vertical tails. However, these and other types of structures, when used in flight, can increase the amount of drag on the aircraft, thereby decreasing the efficiency of the aircraft during flight.

Figure 2:
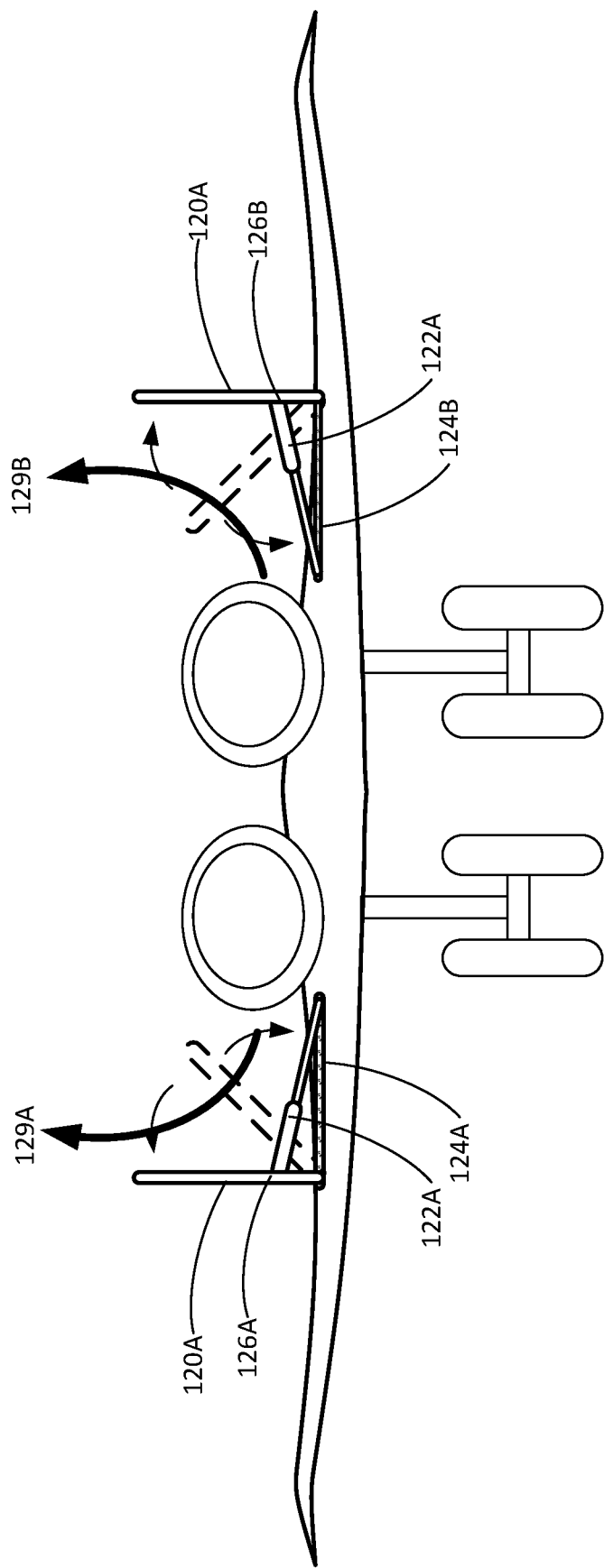
FIG. 2 is a rear-view illustration of a BWB with noise shield panels extended, according to some examples disclosed herein.

The BWB aircraft 100 of FIG. 1 uses shield panels 120A and 120B to reflect at least a portion of the sideways noise (represented by way of example as vectors 116A, 116B, 118A, and 118B) upwards. The shield panels 120A and 120B are designed to be deployed, or moved into an upright position as illustrated in FIG. 2 below, while the BWB aircraft 100 is operational at an airport. For example, the shield panels 120A and 120B may be deployed (extended into an upright position) while the BWB aircraft 100 is at a terminal, moving towards a runway, on a runway ready for takeoff, and/or during and after takeoff. The shield panels 120A and 120B are configured to be retracted into the fuselage 102 of the BWB aircraft 100 during normal flight operations. By using the panels only during terminal area operations, the aerodynamic loads are much lower than fixed reflector fins that must endure flight loads at high Mach and dynamic pressure.

In some examples, the surfaces of the shield panels 120A and 120B, as well as the cavities (not shown) in the fuselage 102 in which the shield panels 120A and 120B fit may be simple faired surfaces. Fairing the surfaces can decrease drag and noise created by the shield panels 120A and 120B as well as the cavity.

FIG. 2 is a rear-view illustration of the BWB aircraft 100 with shield panels 120A and 120B. Shield panels 120A and 120B are shown in a deployed or extended configuration. It should be noted that the shield panels 120A and 120B may be deployed in other configurations between a fully deployed configuration, as illustrated in FIG. 2, and the fully retracted configuration (shown in FIG. 3). Further, it should be noted that the shield panels 120A and 120B may be extended beyond the vertical position illustrated in FIG. 2. This may be done for various auditory reasons.

The shield panels 120A and 120B extend from and retract into cavities 124A and 124B, respectively. Like the shield panels 120A and 120B, the cavities 124A and 124B may be faired surfaces to reduce drag and noise. To extend the shield panels 120A and 120B from the cavities 124A and 124B, pistons 126A and 126B, respectively, are used. The pistons may be hydraulic, pneumatic, electrical, or other types of pistons. The pistons 126A and 126B are rotatably affixed to shield panels 120A and 120B at coupling 128A and 128B, respectively.

Figure 3:
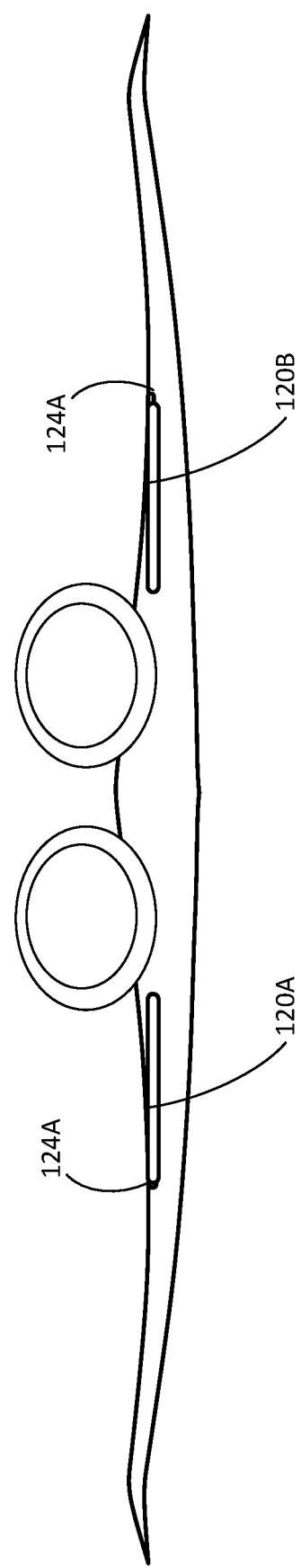
FIG. 3 is a front view illustration of a BWB aircraft with noise shield panels retracted, according to some examples disclosed herein.

The pistons 126A and 126B extend and retract so that the shield panels 120A and 120B move from between a fully deployed configuration, as illustrated in FIG. 2, and the fully retracted configuration (shown in FIG. 3). When in a fully retracted configuration, the shield panels 120A and 120B retract into cavities 124A and 124B so that, during flight, the impact of the shield panels 120A and 120B is minimized. The reflected sound is illustrated by vectors 129A and 129B.

FIG. 3 is a rear-view illustration of the BWB aircraft 100 with shield panels 120A and 120B retracted into cavities 124A and 124B. The configuration illustrated in FIG. 3 may be used during flight, whereby the impact of the shield panels 120A and 120B is minimized because the shield panels 120A and 120B are retracted into cavities 124A and 124B.

Figure 4:
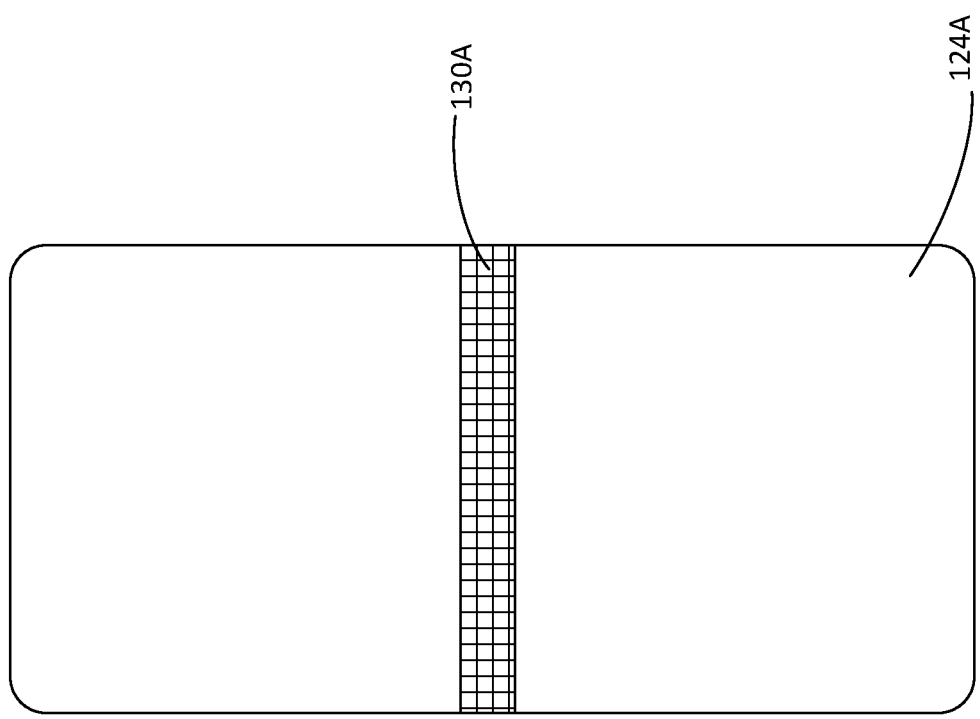
FIG. 4 is a top-down view illustration of a noise shield panel cavity into which a noise shield panel retracts, according to some examples disclosed herein.

FIG. 4 is a top down illustration of the cavity 124A. As noted above, it is helpful to reduce the impact of the shield panels 120A and 120B on the BWB aircraft 100 during flight. One manner in which to do this may be to use piston cavity 130A (similar configuration for cavity 124B). The piston cavity 130A is a depression in the cavity 124A that allows the piston 126A to sit in when the piston is retracted.

Figure 5:
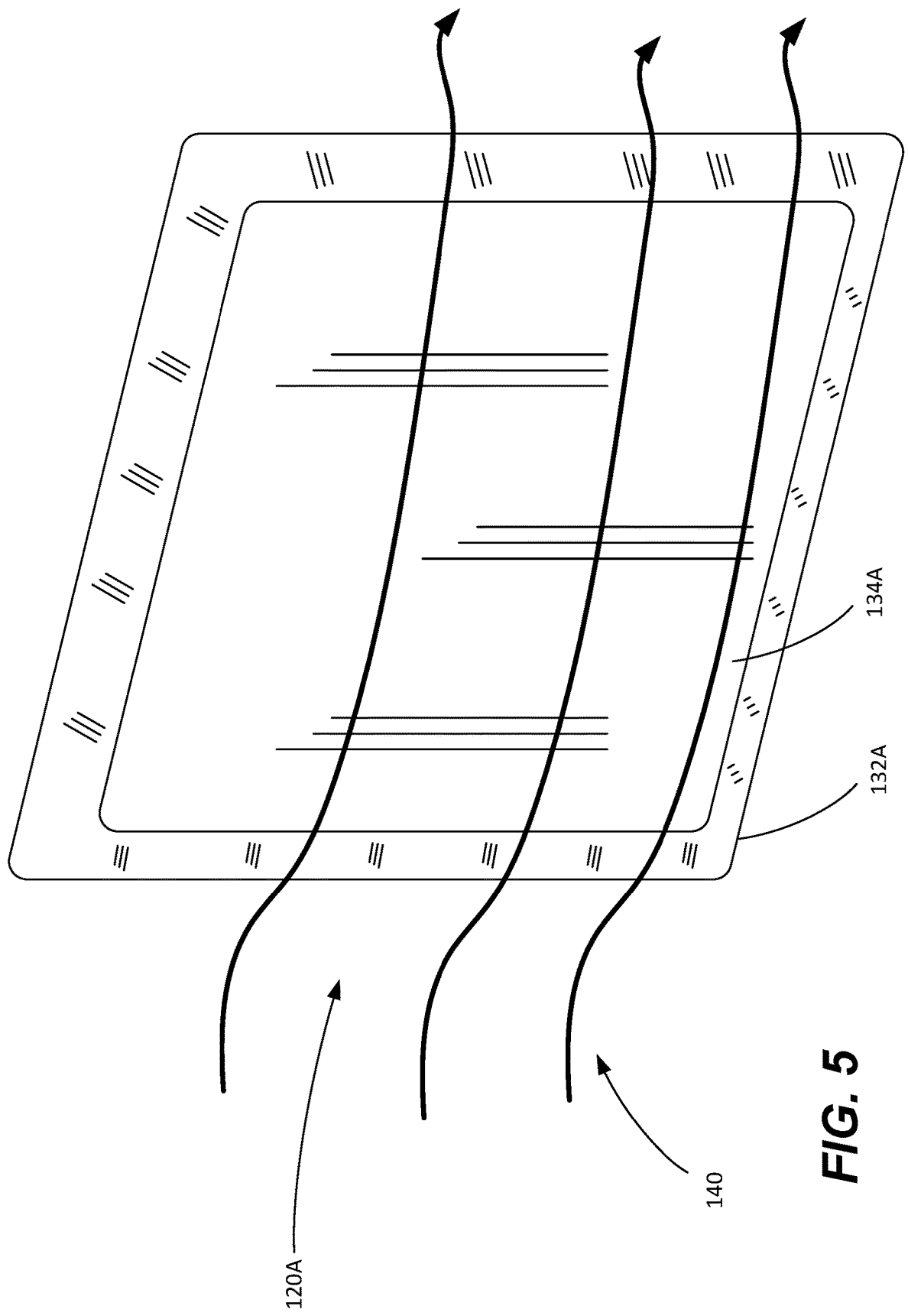
FIG. 5 is a side-view illustration of a noise shield panel with aerodynamically designed surfaces to provide for use during movement of a BWB aircraft, according to some examples disclosed herein.

FIG. 5 is a side-view illustration of the shield panel 120A. The shield panel 120A is designed to minimize aerodynamic effects of the shield panel 120A when the shield panel 120A is in a position other than the retracted position. For example, the shield panel 120A may be extended during takeoff, and returned to a retracted position once in flight. To reduce the aerodynamic effects, the shield panel 120A may be aerodynamically configured. In the example illustrated in FIG. 5, the shield panel 120A has an upper, exterior surface 132A and a lower, interior surface 134A (with similar surfaces that may be used on the shield panel 120B). The shape of the upper, exterior surface 132A and the lower, interior surface 134A of the shield panel 120A allows the shield panel 120A to sit tightly against a mating surface of the cavity 124A (not shown) which is similar configured with proper mating surfaces. Further, the interior surface 134A may further include a curvature to reduce drag of airflow 140 around the interior surface 134A.

Figure 6:
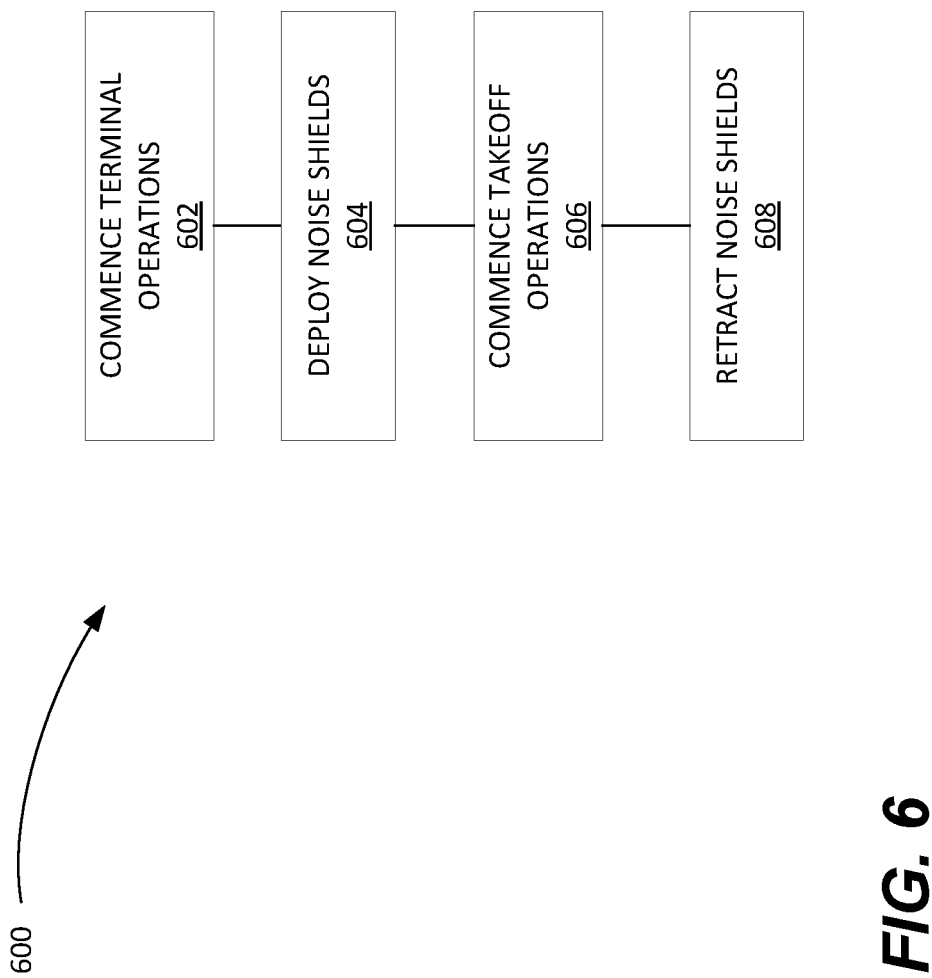
FIG. 6 illustrates a process for using noise shields to operate an aircraft, according to some examples disclosed herein.

FIG. 6 illustrates a process 600 for operating the aircraft 100. The process 600 and other processes described herein are illustrated as example flow graphs. The order in which the operations are described is not intended to be construed as a limitation, and any number of the described operations can be combined in any order and/or in parallel to implement the processes.

The process 600 commences at operation 602, where terminal operations are commenced. As used herein, "terminal operations" are operations conducted while the aircraft 100 is on the ground at an airport, such as embarking or disembarking passengers, taxing to or from a runway, and the like.

The process 600 continues to operation 604, where shield panels, such as the shield panel 120A and/or the shield panel 120B are deployed. As used herein, "deployed" or "deploy" means the shield panel 120A and/or the shield panel 120B are placed into an extended position other than a fully retracted position, whereby the shield panel 120A and/or the shield panel 120B are retracted into the fuselage of the aircraft 100. For example, as illustrated in FIG. 2, the shield panel 120A and/or the shield panel 120B are illustrated in a deployed position.

The process 600 continues to operation 606, where takeoff operations of the aircraft 100 are commenced. In some configurations, the shield panel 120A and/or the shield panel 120B remained in a deployed position before, during, and/or after takeoff.

The process 600 continues to operation 608, where the shield panel 120A and/or the shield panel 120B are retracted.

While several possible embodiments are disclosed above, embodiments of the present invention are not so limited. For instance, while several possible configurations of hydraulic cylinders, linear actuators, valves, and motors, other suitable actuators and controls could be selected without departing from the spirit of embodiments of the invention. In addition, the location and configuration used for various features of embodiments of the present disclosure can be varied according to a particular aircraft, airport, or landing gear design that requires a slight variation due to, for example, size or weight constraints, runway length, aircraft type, or other factors. Such changes are intended to be embraced within the scope of the invention.

The specific configurations, choice of materials, and the size and shape of various elements can be varied according to particular design specifications or constraints requiring a device, system, or method constructed according to the principles of the invention. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A blended wing body aircraft, comprising:
a fuselage comprising a port wing and a starboard wing continuously coupled to a nose section of the aircraft;
a first main engine housed within a first nacelle;
a second main engine housed within a second nacelle adjacent to the first nacelle;
a first shield panel located proximate to the first nacelle laterally disposed between the first main engine and the port wing, the first shield panel configured to be deployed to reduce at least a portion of noise emanating from the first main engine; and
a second shield panel located proximate to the second nacelle laterally disposed between the second main engine and the starboard wing, the second shield panel configured to be deployed to reduce at least a portion of noise emanating from the second main engine,
wherein the fuselage further comprises a first cavity to receive the first shield panel when the first shield panel is retracted into the fuselage, and a second cavity to receive the second shield panel when the second shield panel is retracted into the fuselage.

2. The aircraft of claim 1, wherein the first shield panel comprises a first piston rotatably affixed to the first shield panel and the second shield panel comprises a second piston rotatably affixed to the second shield panel, wherein the first piston is extended to deploy the first shield panel and the second piston is extended to deploy the second shield panel.

3. The aircraft of claim 2, wherein the first piston or the second piston are extended using a hydraulic system, a pneumatic system, or an electrical motor.

4. The aircraft of claim 1, wherein the first shield panel comprises an exterior surface and an interior surface, wherein the interior surface comprises a curvature that reduces drag.

5. A method of operating a blended wing body aircraft, the method comprising:
commencing, using a blended wing body aircraft including a fuselage comprising a port wing and a starboard wing continuously coupled to a nose section of the aircraft, terminal operations;
deploying a shield panel located proximate to a first nacelle laterally disposed between a first main engine and the port wing to shield at least a portion of noise emanating from the first main engine housed within the first nacelle of the aircraft;
commencing takeoff operations; and
retracting the shield panel, wherein the fuselage comprises a cavity to receive the shield panel when the shield panel is retracted into the fuselage.

6. The method of claim 5, wherein the shield panel comprises a piston rotatably affixed to the shield panel, wherein the piston is extended to deploy the shield panel.

7. The method of claim 6, wherein the piston is extended using a hydraulic system, a pneumatic system, or an electrical motor.

8. The method of claim 5, wherein the shield panel comprises an exterior surface and an interior surface, wherein the interior surface comprises a curvature that reduces drag.

9. An aircraft, comprising:
a fuselage;
a first main engine housed within a first nacelle; and
a first shield panel located proximate to the first nacelle laterally disposed between the
first main engine and a port wing, the first shield panel configured to be deployed to reduce at least a portion of noise emanating from the first main engine,
wherein the fuselage comprises a first cavity to receive the first shield panel when the first shield panel is retracted into the fuselage.

10. The aircraft of claim 9, wherein the aircraft is a blended wing body aircraft.

11. The aircraft of claim 9, further comprising:
a second main engine housed within a second nacelle; and
a second shield panel located proximate to the second nacelle between the second main engine and a starboard wing, the second shield panel configured to be deployed to reduce at least a portion of noise emanating from the second main engine.

12. The aircraft of claim 11, wherein the fuselage comprises a second cavity to receive the second shield panel when the second shield panel is retracted into the fuselage.

13. The aircraft of claim 11, wherein the first shield panel comprises a first piston rotatably affixed to the first shield panel and the second shield panel comprises a second piston rotatably affixed to the second shield panel, wherein the first piston is extended to deploy the first shield panel and the second piston is extended to deploy the second shield panel.

14. The aircraft of claim 13, wherein the first piston or the second piston are extended using a hydraulic system, a pneumatic system, or an electrical motor.

15. The aircraft of claim 11, wherein the first shield panel comprises an exterior surface and an interior surface, wherein the interior surface comprises a curvature that reduces drag.

* * * * *